United States Patent
Raisch

(10) Patent No.: US 7,593,413 B2
(45) Date of Patent: Sep. 22, 2009

(54) SECURE SYSTEM AND METHOD FOR SAN MANAGEMENT IN A NON-TRUSTED SERVER ENVIRONMENT

(75) Inventor: Christoph Raisch, Gerlingen (DE)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 10/538,537

(22) PCT Filed: Nov. 25, 2003

(86) PCT No.: PCT/EP03/50895
§ 371 (c)(1),
(2), (4) Date: Jun. 10, 2005

(87) PCT Pub. No.: WO2004/057798

PCT Pub. Date: Jul. 8, 2004

(65) Prior Publication Data
US 2006/0114917 A1 Jun. 1, 2006

(30) Foreign Application Priority Data
Dec. 20, 2002 (EP) .................................. 02102852

(51) Int. Cl.
H04L 12/28 (2006.01)
H04L 12/56 (2006.01)
(52) U.S. Cl. ...................................... 370/401; 709/227
(58) Field of Classification Search ................. 709/219, 709/223, 224, 227
See application file for complete search history.

(56) References Cited

U.S. PATENT DOCUMENTS

| 7,194,538 B1* | 3/2007 | Rabe et al. ................... 709/224 |
| 2001/0054093 A1* | 12/2001 | Iwatani ....................... 709/223 |
| 2002/0156984 A1* | 10/2002 | Padovano .................... 711/148 |
| 2002/0174211 A1 | 11/2002 | Ishizaki et al. ............... 709/223 |
| 2003/0208589 A1* | 11/2003 | Yamamoto ................... 709/224 |
| 2004/0233910 A1* | 11/2004 | Chen et al. ............... 370/395.5 |

FOREIGN PATENT DOCUMENTS
WO   WO 02/071224 A1   9/2002

OTHER PUBLICATIONS

Adlung, I., et al., "FCP for the IBM eServer zSeries systems: Access to distributed storage", Jul./Sep. 2002, XP-002274801, IBM J. Res. & Dev. vol. 46, No. 4/5, pp. 487-502.

* cited by examiner

Primary Examiner—Chirag G Shah
Assistant Examiner—Minh-Trang Nguyen
(74) Attorney, Agent, or Firm—Harrington & Smith, PC

(57) ABSTRACT

According to the present invention a method and a system is provided for operating a storage area network (SAN) in a server environment in which multiple servers share one Fibre Channel adapter. A SAN Management Server manages regions in storage systems and security, a Fiber Channel Network provides a connection to storage devices, and a plurality of Operating System Images run in said server environment. Furthermore, a trusted SAN Management Client Unit is connected to said SAN Management Server and a Fiber Channel adapter is configured to authenticate said trusted SAN Management Client Unit, whereby the trusted SAN Management Client Unit is configured to issue commands in said Fiber Channel Network in place of each of said Operating System Images.

16 Claims, 4 Drawing Sheets

SECURE SYSTEM AND METHOD FOR SAN MANAGEMENT IN A NON-TRUSTED SERVER ENVIRONMENT

BACKGROUND OF THE INVENTION

1. Field of the Invention

The present invention generally relates to storage area networks. Particularly, the present invention relates to a method and a system for operating a storage area network in a server environment in which multiple servers share one Fibre Channel adapter.

2. Description of the Related Art

Fibre channel is a high speed, full-duplex, serial communications technology used to interconnect input/output (I/O) devices and host systems that can be separated by tens of kilometers. It incorporates the best features of traditional I/O interfaces, like throughput and reliability found in SCSI and PCI, with the best features of networking interfaces, like connectivity and scalability found in Ethernet and Token Ring. It provides a transport mechanism for the delivery of existing commands, and provides an architecture that achieves high performance by allowing a significant amount of processing to be performed in hardware. It can operate with legacy protocols and drivers like SCSI and IP, enabling it to be introduced easily into existing infrastructures.

Fibre channel transfers information between the sources and the users of the information. This information can include commands, controls, files, graphics, video and sound. Fibre channel connections are established between Fibre channel ports residing in I/O devices, host systems, and the network interconnecting them. The network consists of elements like switches, hubs, bridges and repeaters that are used to interconnect the Fibre Channel ports.

There are three Fibre Channel topologies defined in the Fibre Channel architecture. These are Point-to-Point, Switched Fabric and Arbitrated Loop.

Fibre channel switches (or switched fabrics) also include functions commonly called Zoning. These functions allow the user to partition the switch ports into port groups. The ports within a port group, or zone, can only communicate with other ports in the same port group (zone). By using zoning, the I/O from one group of hosts and devices can be completely separated from that of any other group, thus preventing the possibility of any interference between the groups.

This is also referred to as "soft zoning". The way this soft zoning works is that the user assigns nodes to a zone according to the node's World Wide Name—either the World Wide Port Name (WWPN) or the World Wide Node Name (WWNN). The name server captures this information, which is a function embedded within the switch. Then, whenever a port communicates with the name server to find out to which nodes it is allowed to connect, the name server will respond only with the nodes that are within that port's zone.

Since the standard Fibre Channel device drivers do communicate with the name server in this manner, this type of zoning is adequate for most situations. However, it is possible that a device driver could be designed that would attempt to access nodes not in its list of allowed connections. If this occurred, the switch would neither prevent nor detect the violation.

In order to prevent this case, switches also optionally implement a mechanism called "hard zoning" in addition to soft zoning, where the switch network decides based solely on source and destination address of each frame if this frame is allowed to be transported.

Fiber channel Storage Area Networks (SANs) are networks that connect storage devices to host servers. They are built upon the Fibre Channel technology as a networking infrastructure. What differentiates SANs from previous interconnection schemes is the basic concept that all (or mostly all) of the storage can be consolidated in one large "storage area" that allows centralized (simplified) management in addition to any-to-any connectivity between host servers and the storage.

Fibre channel SANs have the potential to allow the interconnection of open systems and storage (i.e., non-zSeries) in the same network as zSeries systems and storage. This is possible because the protocols for both open attachment and zSeries attachment are being mapped to the FC-4 layer of the Fibre Channel architecture.

In Fibre Channel attachments, LUNs have an affinity to the host's Fibre Channel adapter (via the adapter's World Wide Unique Identifier, a.k.a. the World Wide Port Name), independent of which ESS (IBM Enterprise Storage Server) Fibre Channel port the host is attached to. Therefore, in a switched fabric configuration where a single Fibre Channel host can have access to multiple Fibre Channel ports on the ESS, the sets of LUNs, which may be accessed by the Fibre Channel host, are the same on each of the ESS ports.

One result of this implementation is that with Fibre Channel, unlike in SCSI, hosts that are attached to ESS via a fabric to the same Fibre Channel port may not be able to "see" the same LUNs, since the LUN masking can be different for each Fibre Channel host. In other words, each ESS can define which host has access to which LUN.

Another method is to create zones in the switch such that each Fibre Channel port from each host is constrained to attach to one Fibre Channel port on the ESS, thereby allowing the host to see the LUNs via one path only.

Details of the Fibre Channel specification are shown in the following standards: Fibre Channel Physical and Signaling Interface (FC-PH), ANSI X3.230-1994; Fibre Channel Second Generation Physical Interface (FC-PH-2), ANSI X3.297-1997; Fibre Channel Third Generation Physical Interface (FC-PH-3), ANSI X3.303-199x, Revision 9.4 and Fibre Channel Arbitrated Loop (FC-AL), ANSI X3.272-1996. Further relevant standards are FC-FS, FC-GS-3.

Further information concerning the Fibre Channel is disclosed in The Fibre Channel Consultant—A Comprehensive Introduction (Robert W. Kembel, 1998) and The Fibre Channel Consultant—Arbitrated Loop (Robert W. Kembel, 1996).

EP 1 115 225 A2, by Barry Stanley Barnett et al., assigned to International Business Machines Corporation, Armonk, N.Y., US, filed Dec. 22, 2000, published Jul. 11, 2001, "Method and system for end-to-end problem determination and fault isolation for storage area networks" discloses a method and system for problem determination and fault isolation in a storage area network (SAN). A complex configuration of multi-vendor host systems, FC switches, and storage peripherals are connected in a SAN via a communications architecture (CA). A communications architecture element (CAE) is a network-connected device that has successfully registered with a communications architecture manager (CAM) on a host computer via a network service protocol, and the CAM contains problem determination (PD) functionality for the SAN and maintains a SAN PD information table (SPDIT). The CA comprises all network-connected elements capable of communicating information stored in the SPDIT. The CAM uses a SAN topology map and the SPDIT are used to create a SAN diagnostic table (SDT). A failing component in a particular device may generate errors that cause devices along the same network connection path to generate errors.

As the CAM receives error packets or error messages, the errors are stored in the SDT, and each error is analyzed by temporally and spatially comparing the error with other errors in the SDT. If a CAE is determined to be a candidate for generating the error, then the CAE is reported for replacement if possible.

US 2001/0054093 A1, by Sawao Iwatani, Kawasaki, Japan, filed Feb. 9, 2001, published Dec. 20, 2001, "Storage area network management system, method, and computer-readable medium" discloses an integrated management mechanism of a storage area network (SAN) integrating and managing a traditionally dispersed security system from a single source and automates security management in the SAN. The integrated management mechanism integrates and manages the SAN, and is configured so that access relationships of the host computers and the storage devices of the SAN are managed using the integrated management mechanism. An access path on the integrated management mechanism, including a region of the storage devices to which access is attempted from the host computer, the fiber channel adapters used when accessing that storage, and the host bus adapters (HBA) are configured. Based on the access path information configured, the integrated management mechanism establishes respective storage settings, zoning settings, and accessible region permissions for a SAN management mechanism of the host computer, a zoning settings mechanism of the switch, and a storage management mechanism of the storage device.

OBJECT OF THE INVENTION

Starting from this, the object of the present invention is to provide a method and a system for operating a storage area network in a server environment, in which multiple server share one Fibre Channel adapter, having an improved security mechanism.

BRIEF SUMMARY OF THE INVENTION

The foregoing object is achieved by a method and a system as laid out in the independent claims. Further advantageous embodiments of the present invention are described in the sub claims and are taught in the following description.

According to the present invention a method and a system is provided for operating a storage area network (SAN) in a server environment in which multiple servers share one Fibre Channel adapter. A SAN Management Server manages regions in storage systems and security and/or detecting errors and configuring the SAN, a Fiber Channel Network provides a connection to storage devices, and a plurality of Operating System Images run in said server environment. Furthermore, a trusted SAN Management Client Unit is connected to said SAN Management Server and a Fiber Channel adapter, whereby the trusted SAN Management Client Unit is configured to issue commands in said Fiber Channel Network in place of each of said Operating System Images.

In a preferred embodiment of the present invention, the server environment includes virtual servers and/or partitioned servers.

Preferably, the SAN Management Server is configured to distinguish a first set of commands and a second set of commands, whereby the first set of commands are processed by the SM Client together with said SAN, and whereby said second set of commands are processed by said OS Images without access to said SAN. Favorably, the Fiber Channel adapter (FC adapter) is configured to authenticate said trusted SAN Management Client Unit.

Advantageously, the FC adapter and said SAN may be adapted to restrict the access of the untrusted OS Images to the minimal necessary set of commands. Alternatively, the FC adapter and a virtualization layer of the virtual server may be adapted to restrict the access of the untrusted OS Images to the minimal necessary set of commands.

In another embodiment of the present invention, only one SM Client is provided in order to keep the server load small. Optionally, one or more backup SM Clients are provided to provide redundancy.

Advantageously, only the SM Client is registered for receiving messages from the SAN and the SM Client is configured to forward said messages only to said SM Server. Optionally, the FC Adapter is configured to forward all messages for which a registration is not necessary solely to the SM Client and not to the untrusted OS Images.

In a different embodiment of the present invention the server is equipped with two classes of agents, namely, the SM Client and a Remote Access Server (RA Server). Preferably, the server is equipped with repository for keeping authorization data for accessing the RA Server.

Preferably, only the SM Client and the FC adapter are configured to gather information used for billing the use of resources by each untrusted OS Image. Advantageously, the SM Framework is adapted to communicate with a Firewall control application, in order to set the access rights.

In a further embodiment of the present invention the SM Client is adapted to function as a router for the requests from the SM server to the RA server. Preferably, an existing telnet/sshd server forms the RA Server.

Furthermore, the present invention may be implemented as a method for operating a storage area network (SAN) in a server environment in which multiple operating system images share one Fibre Channel adapter, in which the SAN is managed by a SAN Management software with at least a SAN Management server and at least a SAN Management client with a communication path to said Fibre Channel Adapter. The requests issued by the SAN Management server are separated into at least two groups, namely, a first group is processed by the Fibre Channel adapter and the SAN on behalf of the SM client in place of other operating systems which share the same adapter, corresponding to a trusted path, and a second group is processed by the other operating systems without the need to send or receive requests to or from the FC adapter and the SAN.

In a preferred embodiment of the method all information contained in unsolicited messages generated in the SAN and FC adapter are routed to the SAN Manager by the SAN management client. Preferably, the HBA_API binding requests are used to modify the firewall.

Optionally, the communication path from the SAN Management client to the adapter is operated so that it cannot be modified or eavesdropped by another operating system image. In a further preferred embodiment all information relevant for billing individual operating system images are generated in the adapter and are routed through the SAN to the SAN Manager by the SAN client on the trusted path.

Advantageously, the SM server provides authorization data to the SM client to execute requests from said first group. Optionally, SM server and SM client provide authorization data to the other OS images to execute requests from said second group. Preferably, the OS images are operated so that they are only enabled to execute a limited command set in the SAN.

A large number of operating systems (>256, 4000 virtual servers are likely in 2004) have to participate in a SAN with shared FC adapters. Adapters are shared in this type of scenario because of cost reasons and manageability reasons. A server with 256 FC adapters needs for example 256 cables from the adapters to the switch and 256 ports in the switch network.

In a server hosting environment each OS image needs private data, which may not be accessed by other OS images (for example the server configuration) and shared read-write data, for example a shared database shared read only data, for example, a preinstalled operating system image (/usr in a unix system) for LUNs shared by OS images by the same adapter it is not possible to guarantee a completely scsi compliant behavior (for example reserve/release, NACA handling, queuing rules as defined by SAM-2).

Each "untrusted operating system image" is owned by a potentially dangerous entity, for example two companies who compete with each other or a hacker. Owned means the entity that actually has root access and can alter every piece of the operating system image including all SM clients or other software. The OS image owner has no access and cannot modify hardware on its own behalf but needs the machine owner to do this. The machine owner (IT department/ASP/ISP) has full control about all hardware, mappings and policies in the SAN. The machine owner assigns resources in the SAN (most probably LUNs in a disk controller) to the operating system images. The machine owner needs a tool to perform Error Detection and Fault Isolation in the SAN to prevent downtime of operating system images. The machine owner might want to split its hardware into multiple entities and subnets, which can be managed independently from other subnets (group multiple servers or LPARs) A shared adapter does not span subnets, but may span LPARs.

Each OS image is either run on a individual server (blade server) or as a virtual server. Virtual Server environments can be created by for example LPAR-zSeries firmware, the zSeries VM operating system or VMware on Intel based servers).

The presentation of SAN resources in the SAN Manager user interface should be done in such a way that the machine owner can move a OS image from a virtual server to a physical server without getting a completely different kind of view presented by the SM server user interface.

The access of each OS image can be restricted by a firewall in the FC adapter or an other entity, which does not belong to the OS image (otherwise a user with root access rights who has complete control over the OS image has the ability to circumvent it).

The FC to SCSI mapping in each untrusted OS image can be configured by a FC device driver mapping and configuration interface MAP_IF. For example the MAP_IF on certain versions of Fiber Channel on zSeries is implemented by a Linux specific configuration method called proc-file-system to set and query said mapping. The SM server should not rely on correct data reported by a MAP_IF (access enforcement is done by firewall, so either the OS cooperates or won't see any data at all). Measurements for billing cannot be done in the untrusted OS images (because the root user is free to modify the data). Therefore the adapter or other entities have to provide the required measurement data.

Other embodiments may provide multiple WWPNs although the number of WWPNs might be lower than the number of supported OS images per adapter.

BRIEF DESCRIPTION OF THE SEVERAL VIEWS OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE INVENTION

Figure 1:
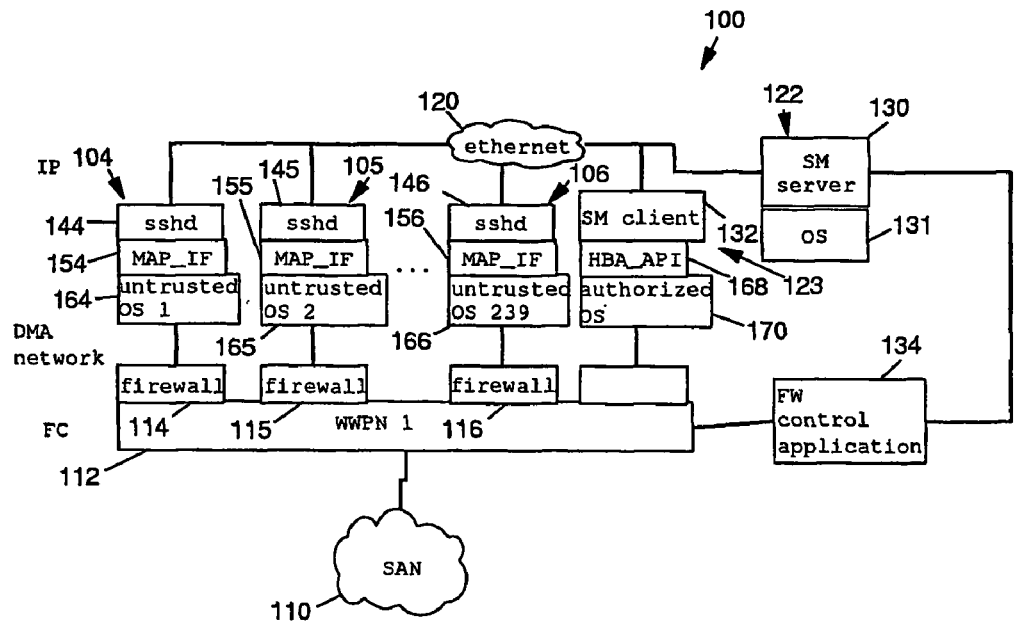
FIG. 1 shows a block diagram illustrating a first embodiment of a system according to the present invention.

With reference to FIG. 1, there is depicted a block diagram illustrating a first embodiment of a system 100 according to the present invention. The system 100 comprises multiple computer systems 104, 105 and 106, all being adapted to access a SAN 110 via one common Fibre Channel adapter 112 having WWPN 1 (World Wide Port Name). For the sake of clarity only three computer systems are depicted. It is acknowledged that the number of computer systems may be in the hundreds or even in the thousands. Having such a high number of computer systems, more than one Fibre Channel adapter may be present in the system, however, even in this case a plurality of computer systems would share one and the same Fibre Channel adapter.

As a gateway between each of the computer systems 104, 105 and 106 and the Fibre Channel adapter a firewall 114, 115 and 116 is provided, respectively, for ensuring that each of the computer systems is only enabled to access permitted portions of the SAN 110. The firewalls 114, 115 and 116 may be integrated in the Fibre Channel adapter or attached to it. On the other hand, all computer systems 104, 105 and 106 are connected to a network 120, such as an Ethernet network.

Furthermore, the system 100 comprises two more computer systems 122 and 123 being connected to the network 120, hosting a SAN Management Server 130 (SM Server) running on an operating system (OS) 131 and a SAN Management Client 132 (SM Client), respectively. The SM Server 130 runs the server portion of a SAN Management System, e.g., Tivoli Storage Network Manager (http://www.tivoli.com/products/index/storage_net_mgr/), whereas the SM Client 132 runs the respective client portion of such system.

The SM Server 130 is further connected to a firewall control application 134 via a communication line, whereas SM Client 132 has got a communication link to the Fibre Channel adapter 112. The firewall control application 134 is provided with communication links to each of the firewalls 114, 115 and 116, either through the Fibre Channel adapter (as depicted) or directly to each of them.

The SM Server 130 accesses each of the computer systems 104, 105 and 106 via a respective Secure Shell Interface 144, 145 and 146, i.e., a program for logging into, and executing commands on, a remote computer. A mapping interface MAP_IF 154, 155, 156 provided in each computer system 104, 105 and 106 takes care about the Fibre Channel to SCSI (Small Computer System Interface) mapping. This can for example be implemented as a command line interface or a configuration file.

Each computer system 104, 105 and 106 runs an operating system 164, 165 and 166, which may be "untrusted." "Untrusted" in this context means that the operating system may be controlled or manipulated by a potentially dangerous entity, e.g., a piece of malicious code, such as a computer virus or a person trying to tamper the operating system in order to access or alter information in the SAN, which should be unreachable for said entity. The operating system itself may be formed by any of a wide variety of operating systems, such as AIX or z/OS by International Business Machines Corporation, UNIX and Linux.

Since the security mechanism in accordance with the present invention take into consideration that an unauthorized SAN access request may be issued by any one of the computer systems 104, 105 and 106, the respective firewall 114, 115 and 116 filters all SAN access requests and only accept those authorized by the firewall control application. Only the firewall control application 134, which is not accessible by any of the computer systems 104, 105 and 106, is enabled to modify firewall settings specifying authorized SAN access requests. According to the first embodiment of the present invention, the SM Server 130 controls the firewall control application 134.

The SM Client 132 runs on top of the HBA_API 168 (Host Bus Adapter Application Program Interface) on top of an operating system 170, which has to be "trusted," i.e., the operating system is managed by an entity not intending to temper SAN access rights or the like. The Fibre Channel adapter 112 is adapted to distinguish untrusted and trusted operating systems. This authorization can be accomplished by identifying the operating system 170 or the SM Client 132 by some means of well-known authorization schemes like fixed source addresses (for example hardware IDs), keys and cryptographic algorithms, or passwords, which are not part of this invention. Requests related to crucial Information, such as SAN configuration, SAN components, SAN access rights, error messages, statistics or billing information may only be accepted coming from the trusted operating system 170 running the SM client 132. Correspondingly, the results to such requests are only returned to the trusted operating system 170. In other words, the SM Client 132 controlled by the SM Server and acting in place of the untrusted operating systems solely performs the SAN management.

The SM server 130 comprises a SM core engine (not shown), which issues requests in order to query and set information in the SAN and in the managed operating systems and a communication module (not shown), which routes the requests and responses from the core engine to the clients. The communication module can either be implemented as part of the SM server or be distributed over the SM server and SM client components, which reside in "trusted" environments.

Figure 2:
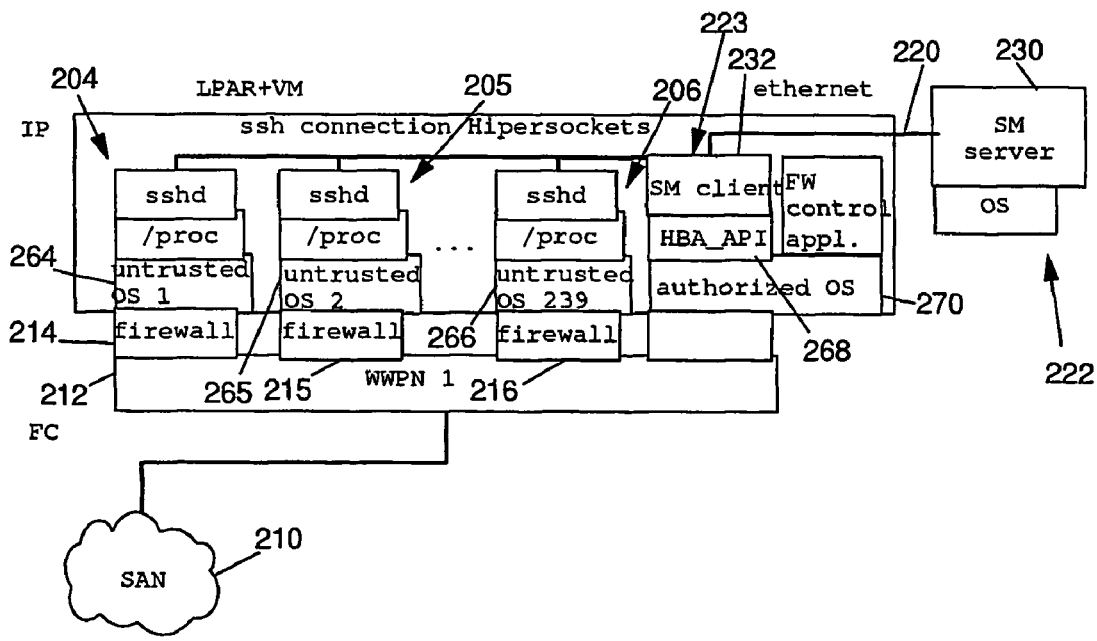
FIG. 2 shows a block diagram illustrating a second embodiment of the system according to the present invention.

The secure shell daemon sshd and the OS specific FC configuration interfaces are summarized as RA (Remote Access) server. The remote access server is adapted to respond to authorized requests sent by a SM server or SM client. In a preferred implementations the SM client and the RA server uses authorization data such as passwords, user-ids and cryptographic keys to identify the originator of the requests. Therefore, the communication module is equipped with a repository (not shown) for said authorization information. The communication module separates fabric related requests, i.e., requests for managing the SAN, and adapter related requests, i.e., requests for managing the Fibre Channel adapter, from the OS specific requests according to the list of commands below. As aforementioned, the connection between the SM server, the SM client and RA server is an IP based network, which runs on, e.g., Ethernet. In a different embodiment some communications between the SM client, SM server and RA Server could utilize the FC adapters capabilities to transport other protocols instead of a separate network. An example would be TCP/IP over Fibre Channel With reference now to FIG. 2, there is depicted a block diagram illustrating a second embodiment of the system according to the present invention.

Correspondingly to the system of the first embodiment (FIG. 1), the present system comprises multiple computer systems 204, 205 and 206, all being adapted to access a SAN 210 via one common Fibre Channel adapter 212 having WWPN 1 (World Wide Port Name). For the sake of clarity only three computer systems are depicted. It is acknowledged that the number of computer systems may be in the hundreds or even in the thousands. Having such a high number of computer systems, more than one Fibre Channel adapter may be present in the system, however, even in this case a plurality of computer systems would share one and the same Fibre Channel adapter.

As a gateway between each of the computer systems 204, 205 and 206 and the Fibre Channel adapter a firewall 214, 215 and 216 is provided, respectively, for ensuring that each of the computer systems is only enabled to access permitted portions of the SAN 210. The firewalls 214, 215 and 216 may be integrated in the Fibre Channel adapter or attached to it.

In contrary to the first embodiment, virtual servers running in a virtual server environment, such as LPAR (logically partitioned mode) plus VM (Virtual Machine), form the computer systems 204, 205 and 206. Furthermore, another virtual server 223 is provided to host a SAN Management Client 232 (SM Client). The computer systems 204, 205 and 206 communicate with the SM Client 232 via a Secure Shell connection on top of Hipersockets.

A separate computer system 222 is provided for hosting a SAN Management Server 230 (SM Server). The SM Server 230 runs the server portion of a SAN Management System, e.g., Tivoli Storage Network Manager, whereas the SM Client 232 runs the respective client portion of such system. The SM Server 230 accesses the SM Client via an Ethernet network 220.

Each computer system 204, 205 and 206 runs an operating system 264, 265 and 266, which may be "untrusted" (cf. above). The operating system itself may be formed by any of a wide variety of operating systems, such as AIX or z/OS by International Business Machines Corporation, UNIX and Linux.

The SM Client 232 runs on top of the HBA_API 268 (Host Bus Adapter Application Program Interface) on top of an operating system 270, which has to be "trusted" (cf. above). Again, the Fibre Channel adapter 212 is adapted to distinguish untrusted and trusted operating systems. Requests related to crucial Information may only be accepted coming from the trusted operating system 270 running the SM client 232. A firewall control application 234 also runs on top of the "trusted" operating system 270. The firewall control application is used to instruct the firewalls 214, 215 and 216, of whether or not to forward a particular access requests from the "untrusted" operating systems 264, 265 and 266 to the SAN 210. In other words, only the firewall control application 234, which is not accessible by any of the computer systems 204, 205 and 206, is enabled to modify firewall settings specifying authorized SAN access requests.

Figure 3:
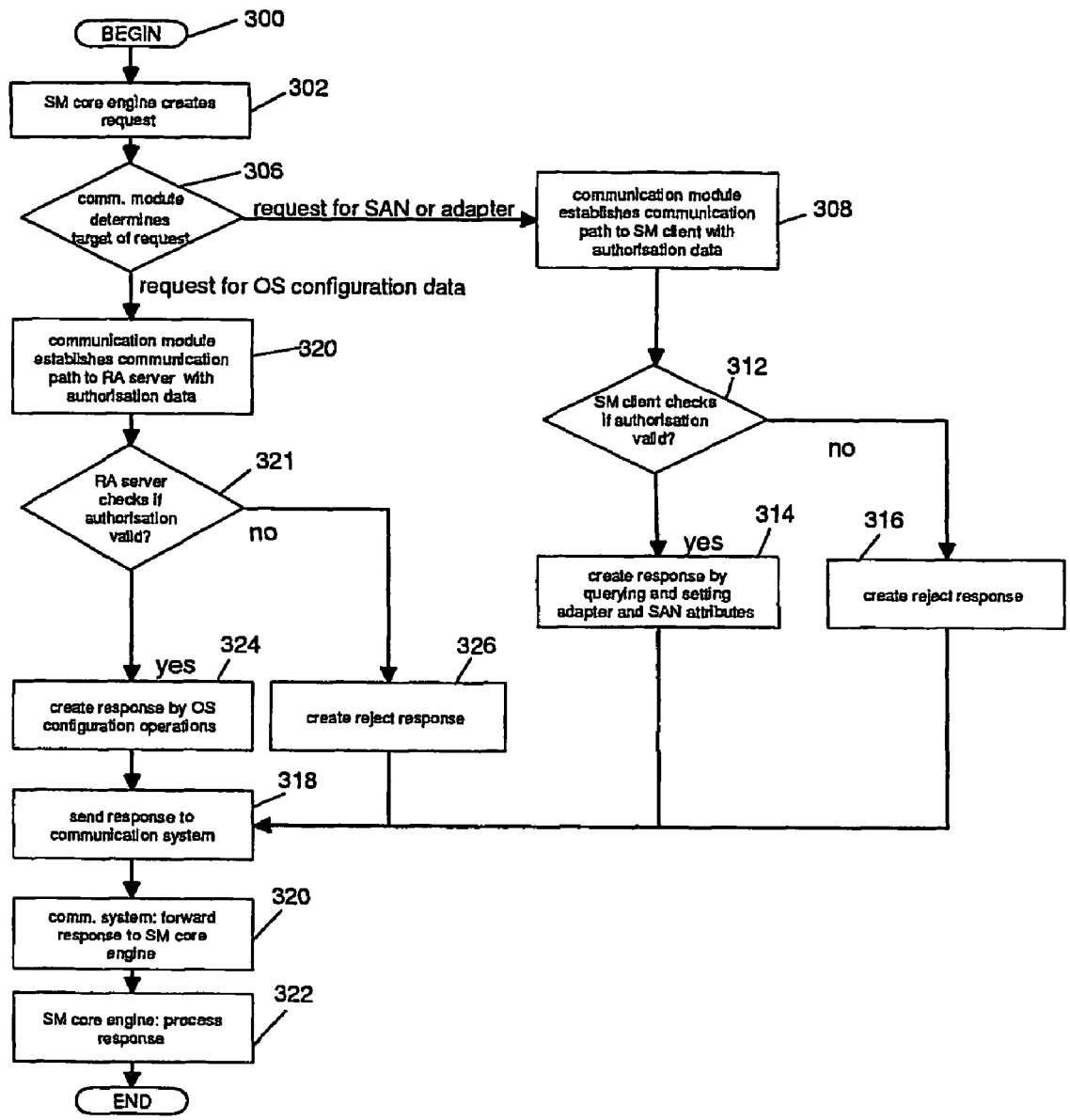
FIG. 3 shows a flow chart illustrating the method for operating a storage area network in a server environment in which multiple servers share one Fibre Channel adapter according to the present invention.

With reference now to FIG. 3, there is depicted a flow chart illustrating the method for operating a storage area network in a server environment in which multiple servers share one Fibre Channel adapter according to the present invention (block 300). Firstly, the SM core engine creates a request (block 302), and then the communication module determines the target of the request (block 306). In case it is a request for the SAN or the Fibre Channel adapter, then the communication module establishes a communication path to the SM Client with respective authorization data (block 308), which can be passwords, user-ids and cryptographic keys Subsequently, the SM Client checks whether or not the authorization is valid (block 312). If yes, the SM Client creates a response by querying entities in the SAN such as switches (for example to retrieve a list of FC devices in the SAN) or disk-controllers (for example to retrieve a list of logical disks in the controller) and setting the Fibre Channel adapter and SAN attributes such as RNID-ELS which is used to register for certain types of error notification messages (block 314).

If no, the SM Client creates a reject response informing the SM core said the request has been rejected (block 316). Both alternative paths continue by sending the response to the communication system (block 318).

Going back to block 306, in case the communication module determines that the SM core engine created a request for the operating system (OS) configuration data, such as the fiber channel to scsi mapping defined by the function HBAGetFcpTargetMappingFunc, the communication module establishes a communication path to the RA Server with the respective authorization data (block 320).

Then, the authorization component in the RA Server, for example a sshd, determines whether or not the authorization is valid (block 321) by comparing the presented user-ids, passwords and keys to user-ids, passwords and keys, which are known by the RA Server to be authorized.

If yes, the RA Server creates a response by OS configuration operations (block 324) such as accessing the fibre channel configuration information stored by the fibre channel device driver of the operating system.

If no, the RA Server creates a reject response (block 326). Again, both alternatives continue by sending the response to the communication system (block 318). Subsequently, the communication system forwards the response to the SM core engine (block 320) and the SM core engine in the SM server processes the response (block 322) as defined in the two mentioned patents.

In the following, the flow and types of requests for a preferred implementation is shown. The syntax of HBA_API commands may be found in "Fibre Channel HBA API Working draft" (ftp://ftp.t11.org/t11/pub/fc/hba/02-268v2.pdf)

Figure 4:
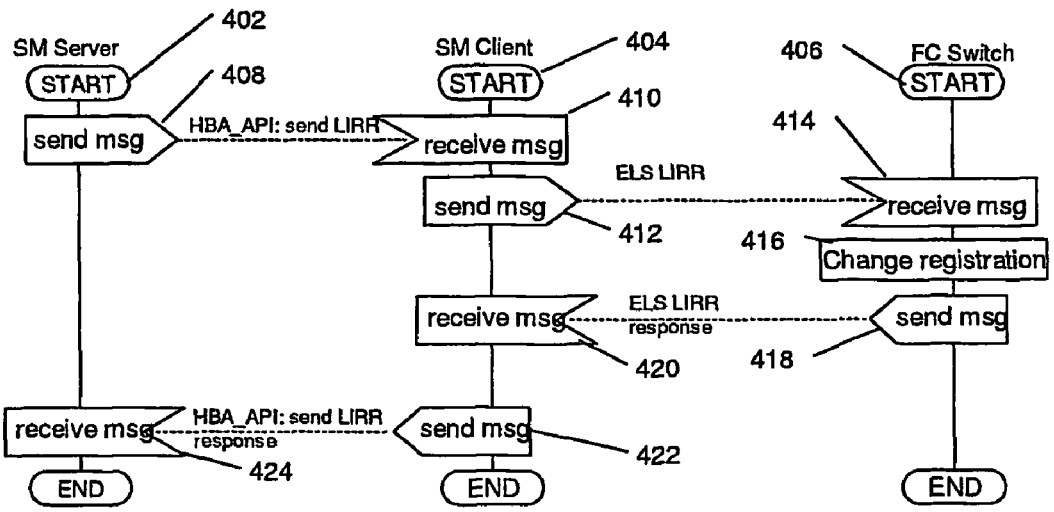
FIG. 4 shows a flow chart illustrating simplified signals and flow for the aforementioned type of fabric related HBA_API commands.

1. Firstly, the fabric and adapter related requests CT, ELS, SCSI commands are listed. The SM client using adapter and SAN resources handles these commands:

typedef HBA_STATUS(* HBASendCTPassThruFunc) (HBA_HANDLE, void *, HBA_UINT32, void *, HBA_UINT32);

typedef HBA_STATUS (* HBASendRNIDFunc)(HBA_HANDLE, HBA_WWN, HBA_WWNTYPE, void *, HBA_UINT32 *);

typedef HBA_STATUS (* HBASendScsiInquiryFunc) (HBA_HANDLE, HBA_WWN, HBA_UINT64, HBA_UINT8, HBA_UINT32, void *, HBA_UINT32, void *, HBA_UINT32);

typedef HBA_STATUS (* HBASendReportLUNsFunc)(HBA_HANDLE, HBA_WWN, void *, HBA_UINT32, void *, HBA_UINT32);

typedef HBA_STATUS (* HBASendReadCapacityFunc)(HBA_HANDLE, HBA_WWN, HBA_UINT64, void *, HBA_UINT32,void *, HBA_UINT32);

typedef HBA_STATUS (* HBASendCTPassThruV2Func) (HBA_HANDLE, HBA_WWN, void *, HBA_UINT32, void *, HBA_UINT32*);

typedef HBA_STATUS (* HBASendRNIDV2Func) (HBA_HANDLE, HBA_WWN, HBA_WWN, HBA_UINT32, HBA_UINT32, void *, HBA_UINT32*);

typedef HBA_STATUS (* HBAScsiInquiryV2Func) (HBA_HANDLE, HBA_WWN, HBA_WWN, HBA_UINT64, HBA_UINT8, HBA_UINT8, void *, HBA_UINT32 *, HBA_UINT8 *,void *, HBA_UINT32 *);

typedef HBA_STATUS (* HBAScsiReportLUNsV2Func) (HBA_HANDLE, HBA_WWN, HBA_WWN, void *, HBA_UINT32 *,HBA_UINT8 *, void *, HBA_UINT32 *);

typedef HBA_STATUS (* HBAScsiReadCapacityV2Func) (HBA_HANDLE, HBA_WWN, HBA_WWN, HBA_UINT64, void *,HBA_UINT32 *, HBA_UINT8 *, void *, HBA_UINT32 *);

typedef HBA_STATUS (* HBASendRPLFunc)(HBA_HANDLE, HBA_WWN, HBA_WWN, HBA_UINT32, HBA_UINT32, void *, HBA_UINT32 *);

typedef HBA_STATUS (* HBASendRPSFunc)(HBA_HANDLE, HBA_WWN, HBA_WWN, HBA_UINT32, HBA_WWN,HBA_UINT32, void *, HBA_UINT32 *);

typedef HBA_STATUS (* HBASendSRLFunc)(HBA_HANDLE, HBA_WWN, HBA_WWN, HBA_UINT32, void *, HBA_UINT32 *);

typedef HBA_STATUS (* HBASendLIRRFunc)(HBA_HANDLE, HBA_WWN, HBA_WWN, HBA_UINT8, RBA_UINT8,void *, HBA_UINT32 *);

typedef HBA_HANDLE (* HBAOpenAdapterFunc)(char *);

typedef void (* HBACloseAdapterFunc)(HBA_HANDLE);

typedef HBA_STATUS (* HBAGetAdapterAttributesFunc) (HBA_HANDLE, HBA_ADAPTERATTRIBUTES *);

typedef HBA_STATUS (* HBAGetAdapterPortAttributesFunc) (HBA_HANDLE, HBA_UINT32, HBA_PORTATTRIBUTES *);

typedef HBA_STATUS (* HBAGetPortStatisticsFunc) (HBA_HANDLE, HBA_UINT32, HBA_PORTSTATISTICS *);

typedef HBA_STATUS (* HBAGetDiscoveredPortAttributesFunc) (HBA_HANDLE, HBA_UINT32, HBA_UINT32,HBA_PORTATTRIBUTES *);

typedef HBA_STATUS (* HBAGetPortAttributesByWWNFunc) (HBA_HANDLE, HBA_WWN, HBA_PORTATTRIBUTES *);

typedef void (* HBARefreshInformationFunc)(HBA_HANDLE);

typedef void (* HBAResetStatisticsFunc)(HBA_HANDLE, HBA_UINT32);

typedef HBA_STATUS (* HBAGetEventBufferFunc) (HBA_HANDLE, HBA_EVENTINFO *, HBA_UINT32 *);

typedef HBA_STATUS (* HBASetRNIDMgmtInfoFunc) (HBA_HANDLE, HBA_MGMTINFO *);

typedef HBA_STATUS (* HBAGetRNIDMgmtInfoFunc) (HBA_HANDLE, HBA_MGMTINFO *);
typedef HBA_STATUS (* HBAOpenAdapterByWWNFunc) (HBA_HANDLE *, HBA_WWN);
typedef void (* HBARefreshAdapterConfigurationFunc) ( );
typedef HBA_UINT32 (* HBAGetVendorLibraryAttributesFunc)(HBA_LIBRARYATTRIBUTES *);
typedef HBA_STATUS (* HBAGetFC4StatisticsFunc) (HBA_HANDLE, HBA_WWN, HBA_UINT8, HBA_FC4STATISTICS *);
typedef HBA_STATUS (* HBAGetFCPStatisticsFunc) (HBA_HANDLE, const HBA_SCSIID *, HBA_FC4STATIS
typedef HBA_UINT32 (* HBAGetNumberOfAdaptersFunc)( );
typedef HBA_STATUS (* HBAGetAdapterNameFunc)(HBA_UINT32, char *);

FIG. 4 shows a flow chart illustrating simplified signals and flow for the aforementioned type of HBA_API commands. As apparent from FIG. 4, a SM Server communicates with a SM Client, which communicates with a FC Switch. The SM Server, the SM Client and the FC Switch get started and run independently from each other as illustrated by blocks 402, 404 and 406. It is acknowledged that the following steps only constitute a segment of the operation, and more requests are sent or received before or after the method as described in the following.

Initially the SM server sends request to SM client (block 408, 410). In this example it is a HBASendLIRRFunc. In detail, the SM client uses the HBA API in order to send CT_IU, ELS or FCP_CMD sequences as defined by the Fiber Channel standards FC-FS and FC-GS3 to the fabric (412, 414).

The response generated in fabric as defined by the FC standards is forwarded to SM client by the completion part of the HBA_API call (418,420). The SM client forwards said response to the SM server (422,424).

2. FCP<->SCSI mapping commands

Figure 5:
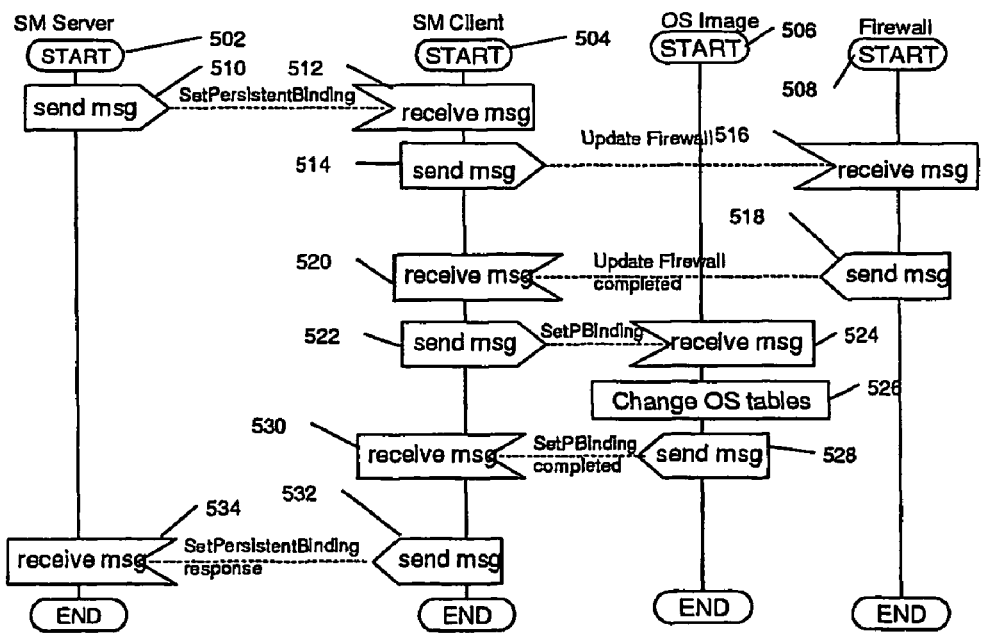
FIG. 5 shows a flow chart illustrating simplified signals and a flow for the aforementioned type of FCP to SCSI mapping HBA_API commands.

These commands are handled via a RA server using OS and OS device driver resources commands. The syntax may be found in "Fibre Channel HBA API Working draft" (ftp:// ftp.t11.org/t11/pub/fc/hba/02-268v2.pdf)

typedef HBA_STATUS (* HBAGetFcpTargetMappingFunc) (HBA_HANDLE, HBA_FCPTARGETMAPPING *);
typedef HBA_STATUS (* HBAGetFcpPersistentBindingFunc)(HBA_HANDLE, HBA_FCPBINDING *);
typedef HBA_STATUS (* HBAGetBindingCapabilityFunc) (HBA_HANDLE, HBA_WWN, HBA_BIND_CAPABILITY *);
typedef HBA_STATUS (* HBAGetBindingSupportFunc) (HBA_HANDLE, HBA_WWN, HBA_BIND_CAPABILITY *);
typedef HBA_STATUS (* HBASetBindingSupportFunc) (HBA_HANDLE, HBA_WWN, HBA_BIND_CAPABILITY);
typedef HBA_STATUS (* HBASetPersistentBindingV2Func) (HBA_HANDLE, HBA_WWN, const HBA_FCPBINDING2 *);
typedef HBA_STATUS (* HBAGetPersistentBindingV2Func) (HBA_HANDLE, HBA_WWN, HBA_FCPBINDING2 *);
typedef HBA_STATUS (* HBARemovePersistentBindingFunc) (HBA_HANDLE, HBA_WWN, const HBA_FCPBINDING2 *);
typedef HBA_STATUS (* HBARemoveAllPersistentBindingsFunc)(HBA_HANDLE, HBA_WWN);
typedef HBA_STATUS (* HBAGetFcpTargetMappingV2Func)(HBA_HANDLE, HBA_WWN, HBA_FCPTARGETMAPPING *);

With reference now to FIG. 5, there is depicted a flow chart illustrating simplified signals and flow for the aforementioned type of HBA API commands. As apparent from FIG. 5, a SM Server communicates again with a SM Client. The SM Client, in return, communicates with a Firewall and an OS Image, respectively. The SM Server, the SM Client, the Firewall and the OS Image get started and run independently from each other as illustrated by blocks 502, 504, 506 and 508. It is acknowledged that the following steps only constitute a segment of the operation, and more requests are sent or received before or after the method as described in the following.

First, the SM server sends a request to the SM client (blocks 510, 512) for example a request with corresponds to the HBASetPersistentBindingV2 HBA_API request. If the SM client has direct control over the firewall it can optionally modify the firewall (514,516,518,520) if this is required by the firewall security policy. The SM client then modifies the firewall by triggering the send-operation of a proprietary update firewall message (514,516).

The firewall signals completion of the operation to the SM client (518,520). Then the SM client triggers a set or query request in untrusted OS image (526) by RA Server (522,524). The SM client waits for the completion message of said request (528,530) SM client returns the response of said requests to the SM server (532,534).

3. Incoming ELSses (RNID)

These are messages, which initiate in the fabric and need to be forwarded to the SM server. These messages are used to identify the source of problems, which occur in the SAN.

Figure 6:
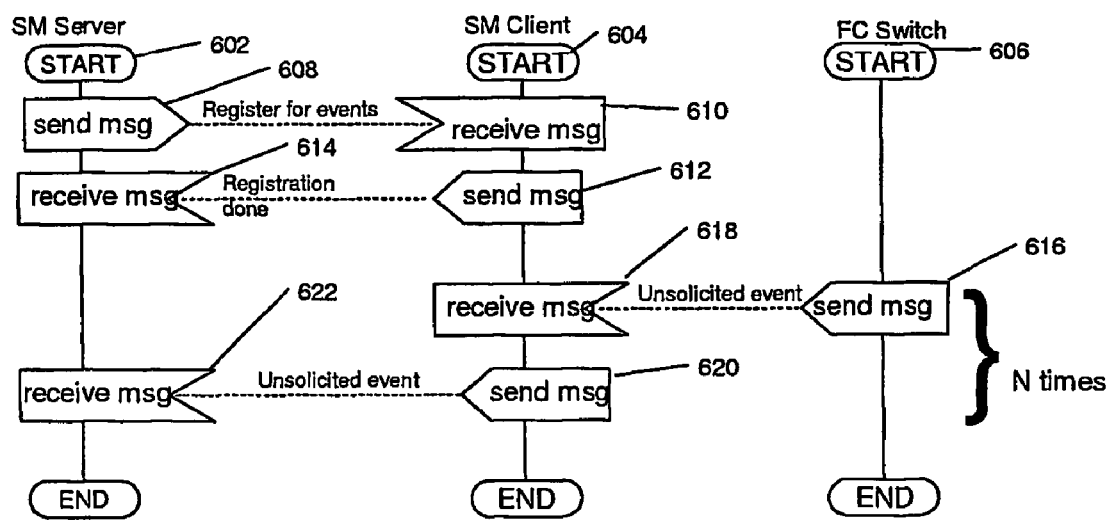
FIG. 6 shows a flow chart illustrating simplified signals and a flow for the aforementioned type of HBA_API commands to handle ELS requests initiated by the SAN.

Commands defined in HBA_API to handle incoming ELSses:

typedef HBA_STATUS (* HBARegisterForAdapterAddEventsFunc)(void (*)(void *, HBA_WWN, HBA_UINT32),void *,HBA_CALLBACKHANDLE *);
typedef HBA_STATUS (* HBARegisterForAdapterEventsFunc)(void (*)(void *, HBA_WWN, HBA_UINT32),void *,HBA_HANDLE, HBA_CALLBACKHANDLE *);
typedef HBA_STATUS (* HBARegisterForAdapterPortEventsFunc)(void (*)(void *, HBA_WWN, HBA_UINT32, HBA_UINT32),void *, HBA_HANDLE, HBA_WWN, HBA_CALLBACKHANDLE *);
typedef HBA_STATUS (* HBARegisterForLinkEventsFunc)(void (*)(void *, HBA_WWN, HBA_UINT32, void *,HBA_UINT32),void *, void *, HBA_UINT32, HBA_HANDLE, HBA_CALLBACKHANDLE *);
typedef HBA_STATUS (* HBARegisterForAdapterPortStatEventsFunc)(void (*)(void *, HBA_WWN, HBA_UINT32), void *,HBA_HANDLE, HBA_WWN, HBA_PORTSTATISTICS,HBA_UINT32, HBA_CALLBACKHANDLE *);
typedef HBA_STATUS (* RBARegisterForTargetEventsFunc)(void (*)(void *, HBA_WWN, HBA_WWN, HBA_UINT32),void *, HBA_HANDLE, HBA_WWN, HBA_WWN,HBA_CALLBACKHANDLE *, HBA_UINT32);
typedef HBA_STATUS (* HBARemoveCallbackFunc) (HBA_CALLBACKHANDLE);

Now, with reference to FIG. 6, depicting a flow chart illustrating simplified signals and flow for the aforementioned type of HBA_API commands. As apparent from FIG. 6, a SM Server communicates with a SM Client, which communicates with a FC Switch. The SM Server, the SM Client and the FC Switch get started and run independently from each other as illustrated by blocks 602, 604 and 606. It is acknowledged that the following steps only constitute a segment of the operation, and more requests are sent or received before or after the method as described in the following.

The SM server (602) instructs the SM client (604) to register once for events by HBA_API (608,610) and waits for the confirmation of the completion (612,614), untrusted OS images are not allowed to register. After this is done each message (616) created by the SAN triggers the following procedure:
1. SM client receives event from FC adapter (616,618)
2. SM client forwards event to SM server (620,622)

In an alternative implementation the SM client may filter and condense the messages (616,618) to reduce the number of messages sent to the SM server.

HBA_API functions which are not relevant to this invention:
typedef HBA_UINT32 (* BAGetVersionFunc)( );
typedef HBA_STATUS (* HBALoadLibraryFunc)( );
typedef HBA_STATUS (* HBAFreeLibraryFunc)( );

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A computer-implemented method comprising:
managing a storage area network (SAN) with at least a SAN Management server and a SAN Management client, said SAN Management client running a trusted operating system and having a communication path to a Fibre Channel adapter, said Fibre Channel adapter being disposed between the SAN and at least one computer system running an untrusted operating system, said SAN Management server being connected to the at least one computer system and the SAN Management client, said SAN Management client being further connected to the at least one computer system,
separating requests issued by the SAN Management server into at least two groups, where a first group of requests is issued to the SAN Management client and processed by the Fibre Channel adapter and the SAN on behalf of the SAN Management client in place of the at least one computer system, and a second group of requests is issued to and processed by the at least one computer system without the need to send or receive requests to or from the Fibre Channel adapter and the SAN, where the Fibre Channel adapter accepts requests relating to crucial information only from the SAN Management client, where the crucial information comprises information relating to at least one of a SAN configuration, a SAN component, SAN access rights, error messages, statistics or billing information, where the operation of separating the requests issued by the SAN Management server is performed by a communication module that is distributed over the SAN Management server and the SAN Management client,
maintaining authorization data for accessing a Remote Access (RA) Server, where said authorization data is maintained in at least one of the SAN Management server and the SAN Management Client, and
operating the SAN Management Client as a router for requests from the SAN Management server to the RA server, wherein the RA Server comprises a telnet/sshd server, where the connection between the SM server, the SM client and RA server is an internet protocol (IP) based network.

2. The method according to claim 1, further comprising:
routing all information contained in unsolicited messages generated in the SAN and Fibre Channel adapter to the SAN Management server by the SAN management client.

3. The method according to claim 1, further comprising:
using Host Bus Adapter_Application Program Interface binding requests to modify a firewall interposed between the at least one computer system and the Fibre Channel adapter, and operating the communication path from the SAN Management client to the Fibre Channel adapter so that it cannot be modified or eavesdropped by the at least one computer system.

4. The method according to claim 1, further comprising:
accessing all information relevant for billing individual ones of the at least one computer system, where said information is generated in the Fibre Channel adapter and the SAN and where said information is accessed only through the SAN Management client.

5. The method according to claim 1, further comprising:
said SAN Management server providing first authorization data to the SAN Management client to execute requests from said first group, and said SAN Management server and SAN Management client providing second authorization data to the at least one computer system to execute requests from said second group, and operating the at least one computer system so that it is only enabled to execute a limited command set in the SAN.

6. A computer program product apparatus tangibly storing a computer readable program, where the computer readable program when executed on a computer causes the computer to perform operations to manage a storage area network (SAN), the operations comprising:
managing the SAN comprising at least a SAN Management server and a SAN Management client, said SAN Management client running a trusted operating system and having a communication path to a Fibre Channel adapter, said Fibre Channel adapter being disposed between the SAN and at least one computer system running an untrusted operating system, said SAN Management server being connected to the at least one computer system and the SAN Management client, said SAN Management client being further connected to the at least one computer system, and
separating requests issued by the SAN Management server into at least two groups,
where a first group of requests is issued to the SAN Management client and processed by the Fibre Channel adapter and the SAN on behalf of the SAN Management client in place of the at least one computer system, and
a second group of requests is issued to and processed by the at least one computer system without the need to send or receive requests to or from the Fibre Channel adapter and the SAN, where the Fibre Channel adapter accents requests relating to crucial information only from the SAN Management client, where the crucial information comprises information relating to at least one of a SAN configuration, a SAN component, SAN access rights, error messages, statistics or billing information, where the operation of separating the requests issued by the SAN Management server is performed by a communication module that is distributed over the SAN Management server and the SAN Management client, further comprising an operation of maintaining authorization data for accessing a Remote Access (RA) Server, where said authorization data is maintained in at least one of the SAN Management server and the SAN Management Client, further comprising an operation of operating the SAN Management Client as a router for requests from the SAN Management server to the RA server, wherein the RA Server comprises a telnet/sshd server, where the connection between the SM server, the SM client and RA server is an internet protocol (IP) based network.

7. The computer program product apparatus as in claim 6, further comprising an operation of:
routing information contained in unsolicited messages generated in at least one of the SAN and Fibre Channel adapter to the SAN Management server by the SAN management client.

8. The computer program product apparatus as in claim 6, further comprising an operation of:
using Host Bus Adapter_Application Program Interface binding requests to modify a firewall interposed between said at least one computer system and said Fibre Channel adapter.

9. The computer program product apparatus as in claim 6, further comprising an operation of:
operating the communication path from the SAN Management client to the Fibre Channel adapter so that it cannot be accessed by the at least one computer system.

10. The computer program product apparatus as in claim 6, further comprising an operation of:
accessing information relevant for billing individual ones of the at least one computer system, where said information is generated in the Fibre Channel adapter and the SAN and where said information is accessed only through the SAN Management client.

11. The computer program product apparatus as in claim 6, further comprising an operation of:
providing authorization data from the SAN Management server to the SAN Management client to execute requests from said first group of requests.

12. The computer program product apparatus as in claim 6, further comprising an operation of:
providing authorization data from the SAN Management server and the SAN Management client to the at least one computer system to execute requests from said second group of requests.

13. The computer program product apparatus as in claim 6, further comprising an operation of enabling the at least one computer system to execute a limited command set in the SAN.

14. A storage area network (SAN) Management server, comprising:
a first interface configured to couple to a SAN Management client running a trusted operating system, said SAN Management client being further coupled to a SAN via a SAN adapter and to at least one computer system running an untrusted operating system; and
a second interface configured to couple to the least one computer system, said at least one computer system being coupled to the SAN via the SAN adapter and via a unit for regulating access to the SAN;
where said SAN Management server comprises logic for distinguishing a first set of requests from a second set of requests, where the first set of requests is issued to the SAN Management client and processed by the SAN adapter and the SAN on behalf of said SAN Management client in place of the at least one computer system, and where the second set of requests is issued to and processed at least in part by the at least one computer system without the need to send or receive requests to or from the SAN adapter and the SAN,
where the SAN adapter accepts requests relating to crucial information only from the SAN Management client, where the crucial information comprises information relating to at least one of a SAN configuration, a SAN component, SAN access rights, error messages, statistics or billing information, where the operation of separating the requests issued by the SAN Management server is performed by a communication module that is distributed over the SAN Management server and the SAN Management client, where at least one of the SAN Management server and the SAN Management Client is operable to maintain authorization data for accessing a Remote Access (RA) Server, where the SAN Management Client is operated as a router for requests from the SAN Management server to the RA server, wherein the RA Server comprises a telnet/sshd server, where the connection between the SM server, the SM client and RA server is an internet protocol (IP based network.

15. The SAN Management server as in claim 14, where said first set of requests comprises at least one of a SAN request and a SAN adapter request, and where said second set of requests comprises a request for configuration data of the at least one computer system.

16. The computer program product apparatus as in claim 6, where the first group of requests comprises authorized SAN access requests and the second group of requests comprises operating system configuration requests.

* * * * *

UNITED STATES PATENT AND TRADEMARK OFFICE
CERTIFICATE OF CORRECTION

PATENT NO.       : 7,593,413 B2
APPLICATION NO. : 10/538537
DATED            : September 22, 2009
INVENTOR(S)      : Christoph Raisch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Twenty-first Day of September, 2010

David J. Kappos
*Director of the United States Patent and Trademark Office*